US008205632B2

(12) United States Patent
Fishwick

(10) Patent No.: US 8,205,632 B2
(45) Date of Patent: Jun. 26, 2012

(54) FLUID FLOW CONTROL DEVICE

(75) Inventor: James Fishwick, Wigan (GB)

(73) Assignee: BiFold Fluidpower Limited, Manchester (GB)

(*) Notice: Subject to any disclaimer, the term of this patent is extended or adjusted under 35 U.S.C. 154(b) by 1090 days.

(21) Appl. No.: 12/114,453

(22) Filed: May 2, 2008

(65) Prior Publication Data
US 2009/0272442 A1 Nov. 5, 2009

(51) Int. Cl.
G05D 7/00 (2006.01)
(52) U.S. Cl. .................. 137/102; 137/625.66
(58) Field of Classification Search ............ 137/625.66, 137/596.18, 596.2, 102; 91/463; 251/28
See application file for complete search history.

(56) References Cited

U.S. PATENT DOCUMENTS

| | | | | |
|---|---|---|---|---|
| 3,437,011 A | * | 4/1969 | Van Gelder | 91/517 |
| 3,584,652 A | * | 6/1971 | Huntington et al. | 137/627.5 |
| 3,791,398 A | * | 2/1974 | Vickery | 137/625.66 |
| 3,930,515 A | * | 1/1976 | Kennedy et al. | 137/102 |
| 3,958,495 A | * | 5/1976 | Bernhoft | 91/433 |
| 4,050,478 A | * | 9/1977 | Virtue et al. | 137/625.66 |
| 4,306,586 A | | 12/1981 | Spencer | |
| 4,327,773 A | * | 5/1982 | Detweiler | 137/625.66 |
| 4,615,353 A | * | 10/1986 | McKee | 137/102 |
| 4,754,776 A | * | 7/1988 | McKee | 137/102 |
| 5,771,931 A | | 6/1998 | Watson | |
| 6,209,565 B1 | | 4/2001 | Hughes et al. | |
| 2004/0182074 A1 | | 9/2004 | Steinke et al. | |
| 2005/0115232 A1 | | 6/2005 | Tondolo | |

FOREIGN PATENT DOCUMENTS

| | | |
|---|---|---|
| GB | 2355510 A | 4/2001 |
| WO | 2008/065392 A1 | 6/2008 |

* cited by examiner

Primary Examiner — John Rivell
Assistant Examiner — Time Aigbe
(74) Attorney, Agent, or Firm — Michael Best & Friedrich LLP

(57) ABSTRACT

A fluid flow control device such as a volume booster has an inlet, an outlet and an exhaust port all for an operating fluid. A pilot inlet receives a pilot pressure signal which operates a valve stem actuator via a diaphragm assembly. The valve stem is operable to open a supply valve between the inlet and outlet and, separately and independently, to open an exhaust valve disposed between the outlet and the exhaust. In a further position both the valves are closed. Movement of the stem in a reciprocal manner by the diaphragm assembly causes a respective annular shoulder to engage a respective valve and lift it off a valve seat against the force of a biasing spring. A first fluid leak path is provided between the valve stem and the supply valve for allowing fluid to leak through the supply valve chamber when the supply valve is open and a second fluid leak path is defined by the exhaust valve for allowing fluid to leak through the exhaust valve chamber. The leak paths provide for a force balancing arrangement that allows the valve stem to move easily and the diaphragm assembly to be reduced in size. The arrangement allows the exhaust port to be positioned on the same side of the diaphragm assembly as the inlet and outlet so that fluid can be vented through the exhaust at flow volume comparative to the operating fluid flow in the inlet and outlet.

31 Claims, 3 Drawing Sheets

FLUID FLOW CONTROL DEVICE

BACKGROUND

The present invention relates to a fluid flow control device and more particularly, but not exclusively, to such a device that is used to control the flow of pneumatic or hydraulic fluid to an actuator of the kind used in a valve positioner.

In many applications it is desirable to automate the actuation of a pipeline valve via a remote control system. This is particularly necessary in harsh environments such as, for example, a petrochemical pipeline located on land or offshore. The operation of, for example, a ball valve in such a pipeline is often effected by a valve positioner that has a fluid (e.g. pneumatic) actuator for operating the valve. It is often necessary to employ a volume booster to ensure that there is a sufficient sustained volume of fluid (e.g. air) available to the actuator to ensure a rapid response time. The actuator may, for example, take the form of a pneumatically-operated piston and cylinder assembly. The volume booster operates to ensure that the pressure of the supply fluid to the actuator is regulated and the volumetric flow is sustained to achieve the desired actuator stroke speed. Separate flow regulators are often connected to the booster and this serves to increase the complexity of the system in terms of installation, servicing, maintenance and operation.

Volume boosters are generally controlled by a pneumatic pilot signal received from a control part of the valve positioner. The signal is generated in response to a command signal directing the positioner to move the valve to a desired position. The command signal may be an open-loop signal or a closed-loop feedback electrical control signal that takes into account the position of the actuator. In an alternative arrangement the booster may be controlled directly by an electrical signal that operates a solenoid valve in the booster.

A conventional form of volume booster comprises a housing having an operating air inlet and outlet, both of which are in communication with the flow of operating air to the actuator, and a pilot signal inlet connected to the output of the positioner. The communication between the operating air inlet and outlet is selectively interrupted by a supply valve whose position is controlled by diaphragm assembly on which the pilot signal acts. The supply valve is connected to one end of a reciprocal valve stem the other end of which serves to open or close an exhaust valve in an exhaust passage defined in the diaphragm assembly. The pilot signal acts on one side of the diaphragm assembly whereas the outlet air pressure acts on the other side of the diaphragm assembly by virtue of a bleed passage in the housing from the outlet. In the event that force of the pilot signal pressure applied to the first side of the diaphragm assembly exceeds that applied on the other side by the outlet pressure, the force differential serves to move the diaphragm assembly and valve stem to a first position in which the supply valve is open and the exhaust valve remains closed. Operating air can then flow from inlet to outlet so as to drive the actuator and position the valve. When the outlet pressure increases or the pilot signal pressure decreases to the extent that the forces on the diaphragm assembly cause it to move in the opposite direction, the diaphragm assembly moves to a second position in which the supply valve is closed and the diaphragm assembly lifts off the exhaust valve so that excess pressure can vent between the diaphragm assembly and the exhaust valve to the exhaust passage in the diaphragm assembly. The exhaust valve may be defined by a simple poppet valve on the end of the valve stem that seals against a seat defined at a bore in the diaphragm assembly. The location of the exhaust valve and passage means they tend to be relatively small and thus serve to restrict flow. The flow rate is significantly lower than that of the main flow leading to a slow reaction time. This is particularly undesirable in the event of an emergency where it is necessary to vent large volumes of air.

One solution to the problem of restricted exhaust flow is to provide a separate exhaust flow having a capacity equivalent to the main operating air flow. This involves additional components, space and expense. These may be provided in the same housing as the booster or as a separate component.

In one example of a separate exhaust capacity, an external conduit disposed outside the main body of the booster housing interconnects the outlet and the exhaust passage which are provided on opposite sides of the diaphragm assembly. An example of this is pneumatic volume booster Model 200XLR available from Fairchild Industrial Products Company of Winston-Salem, NC, USA. Without the restriction imposed by the space within the body of the booster, the external conduit can have a relatively large size so as to permit the exhaust flow to be as large as the main flow. This solution is relatively large and cumbersome and can therefore be disadvantageous in applications where there are space constraints.

It is an object of the present invention to obviate or mitigate the above, and other, disadvantages. It is also an object of the present invention to provide for an improved, or alternative, fluid flow control device.

SUMMARY

According to the present invention there is provided a fluid flow control device comprising: a housing defining an inlet, an outlet and an exhaust port all for an operating fluid; a pilot inlet for receipt of a pilot signal; a supply path in said housing that extends between the inlet and outlet; an exhaust flow path in the housing that extends between the outlet and the exhaust port; a supply valve chamber interrupting the supply path, a supply valve supported in the supply valve chamber for movement between an open position in which it permits fluid to flow through the supply valve chamber from the inlet to the outlet and a closed position where it prevents significant fluid flow through the valve chamber to the outlet; an exhaust valve chamber in the exhaust path, an exhaust valve in the exhaust valve chamber for movement between an open position in which it permits fluid to flow through the exhaust valve chamber from the outlet to the exhaust port and a closed position where it prevents significant fluid flow through the valve chamber to the exhaust port; a reciprocal actuating member in the housing and engageable with the supply valve and the exhaust valve for moving the supply and exhaust valves between the open and closed positions, the actuating member being movable in response to a difference between the pilot signal and the outlet fluid pressure between a first position in which supply valve is closed and exhaust valve is closed, a second position in which the supply valve is open and the exhaust valve is closed, and a third position in which the exhaust valve is open and the supply valve is closed; wherein there is a first fluid leak path defined by the supply valve for allowing fluid to leak through the supply valve chamber when the supply valve is open, a second fluid leak path defined by exhaust valve for allowing fluid to leak through the exhaust valve chamber.

The leak paths ensure that the pressure across each valve in the open condition is balanced. This means that the force required to move the actuating member in the housing is limited and components can be reduced in size. The arrangement allows the exhaust port to be located adjacent to the exhaust valve chamber so that fluid can be vented quickly.

A first biasing member may be provided for biasing the supply valve to the closed position. Similarly there may be a second biasing member for biasing the exhaust valve to the closed position.

The supply and exhaust valve chambers may each define a respective valve seat, the respective supply and exhaust valves being clear of the respective valve seat in the open positions and sealed against the valve seat in the closed positions.

The supply valve may comprise a poppet having a bore in which part of the actuating member is received, the first leak path being defined by a clearance between a wall of the bore in the poppet and the actuating member.

The supply valve poppet may be received in a support member, a supply valve seal being received between the poppet and the support member.

The support member may be in the form of a sleeve.

The sleeve may have an outer surface and a sleeve sealing member disposed between the outer surface and an internal wall of the housing. The sleeve sealing member may be disposed in a groove in the outer surface. The supply valve seal and the sleeve sealing member may be disposed such that they are aligned with each other in the direction of movement of the valve. This direction is the same as that in which the actuating member moves. The seal and the sleeve sealing member may be annular and may, for example, be O-rings. They may be disposed such that their centres are coaxial with the axis of movement of the supply valve and/or actuating member.

The exhaust valve may comprise a poppet having a bore in which part of the actuating member is received. The second leak path may be defined by a clearance between a wall of the bore in the poppet and the actuating member.

The exhaust valve poppet may be received in a support member, an exhaust valve seal being received between the poppet and the support member. The exhaust valve support member may in the form of a sleeve. The exhaust valve sleeve may have an outer surface and a sleeve sealing member disposed between the outer surface and an internal wall of the housing. Again, the sleeve sealing member may be disposed in a groove in the outer surface. The valve seal and the sleeve sealing member may be disposed such that they are aligned with each other in the direction of movement of the exhaust valve. This direction is the same as that in which the actuating member moves. The seal and the sleeve sealing member may be annular and may, for example, be O-rings. They may be disposed such that their centers are coaxial with the axis of movement of the exhaust valve and/or actuating member.

The supply valve and the exhaust valve seals may each be received in groove defined between the respective poppet and the respective sleeve, the groove having a pair of opposed tapered walls for retaining the respective valve seal therein.

The respective poppet may have a flange and the respective sleeve has a lip between which the groove is defined.

The actuating member may be in the form of an elongate valve stem reciprocally disposed in the housing. It may be selectively engageable with the supply and exhaust valves. It may be independently engageable with the supply and exhaust valves.

The valve stem may have a first shoulder for engaging the supply valve such that movement of the stem to the second position causes the first shoulder to engage the supply valve and move it to the open position. The valve stem may have a second shoulder for engaging the exhaust valve such that movement of the stem to the third position causes the second shoulder to engage the exhaust valve and move it to the open position.

A fluid flow control device according to any preceding claim, wherein the pilot inlet is configured to receive a pilot signal in the form of a fluid pressure signal.

A piston member may be connected to the actuating member and disposed so as to define first and second variable volume chambers in the housing. The first variable volume chamber may be in fluid communication with the pilot inlet and the second variable volume chamber may be in fluid communication with the outlet such that a pressure differential between the fluid in the first and second variable volume chambers causes the piston to move and therefore the actuating stem to move between said first, second or third positions.

The actuating member may be movable to said second position by the piston member when the fluid pressure in the first chamber exceeds that in the second chamber. The actuating member may be movable to the third position by the piston member when the fluid pressure in the second chamber exceeds that in the first chamber.

The piston member may be sealed to the housing.

There may be provided first and second flexible diaphragms, a first diaphragm being disposed between the first chamber and the piston member and being sealed to the housing, a second diaphragm being disposed between the second chamber and the piston member and being sealed to the housing.

There may be provided a vent in the housing at the first chamber for venting pressure to atmosphere. This eliminates the need for downstream pressure relief valves. It may be operational when the first diaphragm fails.

The actuating member may have a first end that is slidably disposed in the supply valve and a second end that is fixed to the piston member.

A third leak path may be defined between the housing and a support for the exhaust valve, the leak path providing fluid communication between the exhaust valve chamber and the second variable volume chamber.

The exhaust port may be defined in the housing between the inlet and the second variable volume chamber.

The exhaust port may be defined immediately adjacent to the exhaust valve chamber.

The exhaust port may be substantially same size as inlet.

BRIEF DESCRIPTION OF THE DRAWINGS

Specific embodiments of the invention will now be described, by way of example only, with reference to the accompanying drawings, in which.

DETAILED DESCRIPTION

Figure 1:
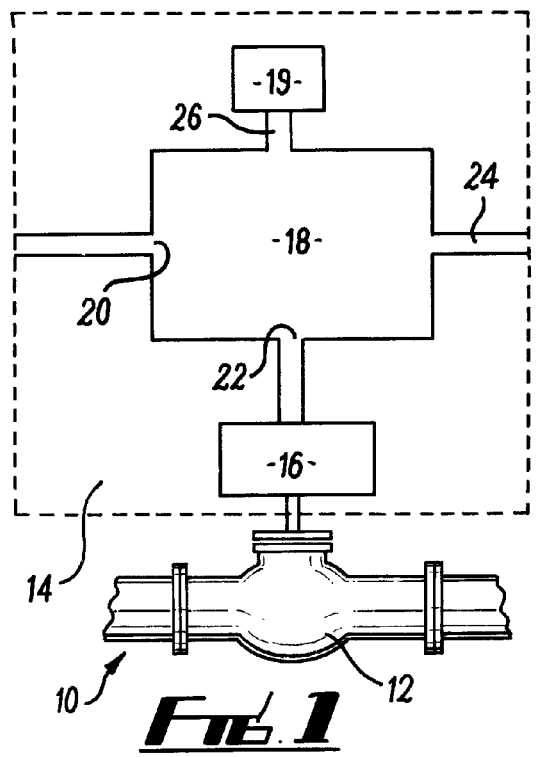
FIG. 1 is a schematic block diagram of a fluid pipeline with a valve positioner connected to a volume booster being a fluid flow control device in accordance with the present invention.

Referring now to FIG. 1 of the drawings, a pipeline 10 for carrying oil, petroleum, chemicals or the like is fitted with a valve 12 that is operable between open and closed positions by a valve positioner 14 that includes a pneumatically operated actuator 16, such as a piston reciprocally disposed in a cylinder. The valve 12 may, for example, be a ball valve that is rotationally disposed within the valve body and has an actuation arm that is moveable by the adjacent actuator 16 via a suitable mechanical link.

The air required to operate the actuator 16 (referred to hereinafter as the "operating air") is provided via a volume booster 18 to ensure that there is a sufficient sustained volumetric flow rate at a given pressure to actuate the valve 12. Operation of the booster 18 is controlled by a controller part 19 of the positioner 14. This ensures that a pilot fluid pressure signal for onward transmission to the booster 18 is generated in response to control signals.

The booster 18 has an operating fluid inlet 20 and outlet 22 that supplies the operating fluid (in the case of this embodiment the operating fluid is air) to the actuator 16, an exhaust port 24 and a pilot port 26 for receipt of the pilot fluid (e.g. air) from the controller 19. The inlet and outlet 20, 22 are configured to allow air to flow at relatively high volumetric rates in comparison to the pilot port 26.

Figure 2:
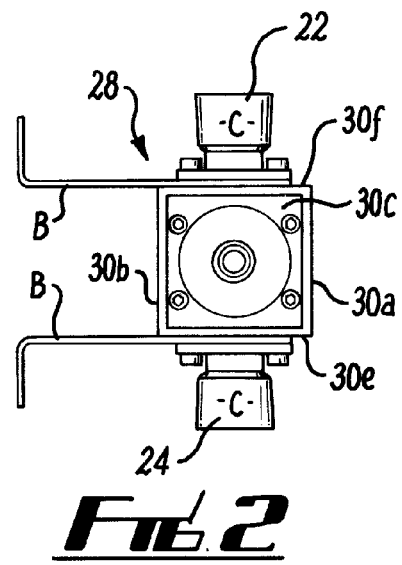
FIG. 2 is a plan view of the device of FIG. 1.
Figure 3:
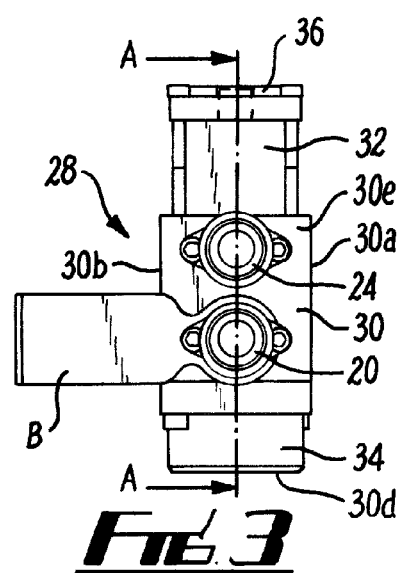
FIG. 3 is a side view of the device of FIG. 2.
Figure 4:
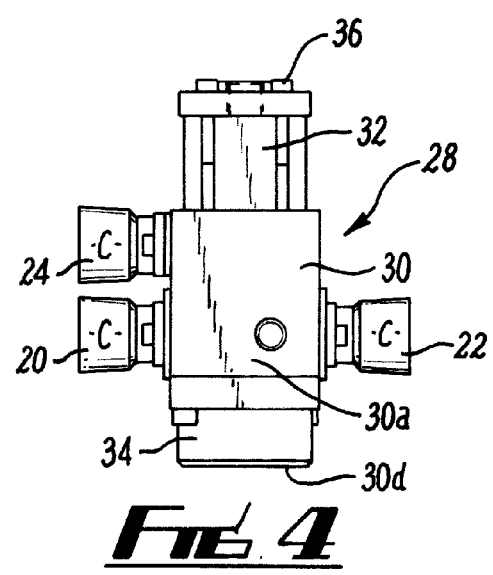
FIG. 4 is a front view of the device of FIG. 2.

The volume booster 18 is shown in detail in FIGS. 2 to 5 and comprises a body 28 that has a main section 30 defining the inlet 20, outlet 22 and the exhaust port 24. In FIGS. 2 to 4 the inlet 20, outlet 22 and exhaust port 24 are shown with cylindrical connector ports C fitted and the body is fitted a pair of brackets B by which it may be fixed to a suitable support or back plate (not shown) in use. The main section 30 of the body is connected between a diaphragm housing 32 and a lower cap 34. The diaphragm housing 32 contains a diaphragm assembly 35 and is closed by a pilot cap 36.

The main section 30 of the body 28 is a parallelepiped with front, rear, upper, lower and first and second opposing side faces 30a, 30b, 30c, 30d, 30e and 30f which have been machined to define different features. The operating air inlet 20 and outlet 22 (ignoring the connector ports C) extend from, respectively, the first and second side faces 30e, 30f of the body at each end of an operating fluid flow path which is interrupted by an intervening supply valve chamber 38 defined in the lower cap 34. The exhaust port 24 extends from the first side face 30e, above the inlet 20, to an exhaust valve chamber 40 defined in the main section 30 of the body.

The pilot cap 36 is penetrated by the pilot port 26 which provides fluid communication with the diaphragm assembly 35. The port 26 has an orifice 41 to restrict and damp the flow.

The body 28 houses a valve stem assembly 42 which extends through a central vertical passage 44 in the main section 30 into the diaphragm housing 32 at one end and the lower cap 34 at the other end. The valve stem assembly 42 comprises an elongate stem 45 having a first end that extends into the supply valve chamber 38 in the lower cap 34, a second end 42b is connected to the diaphragm assembly 35 and an intermediate section 42c part of which passes through the exhaust valve chamber 40. The valve stem 45 is stepped at two locations to define first and second annular shoulders 46, 47 for interaction with supply and exhaust valves 48, 49 which are respectively disposed in the supply and exhaust valve chambers 38, 40. The first annular shoulder 46 is defined adjacent to a lower end of the stem 45 and abuts the supply valve 48 in the supply valve chamber 38 whereas the second annular shoulder 47 is defined approximately mid-way along the length of the stem 45 and abuts the exhaust valve 49 in the exhaust valve chamber 40.

The vertical passage 44 in the main section 30 affords a cylindrical shaped clearance around the intermediate section 42c of the stem 45 and extends between the supply valve and exhaust valve chambers 38, 40 so as to interconnect them with the exhaust port 24.

Figure 5:
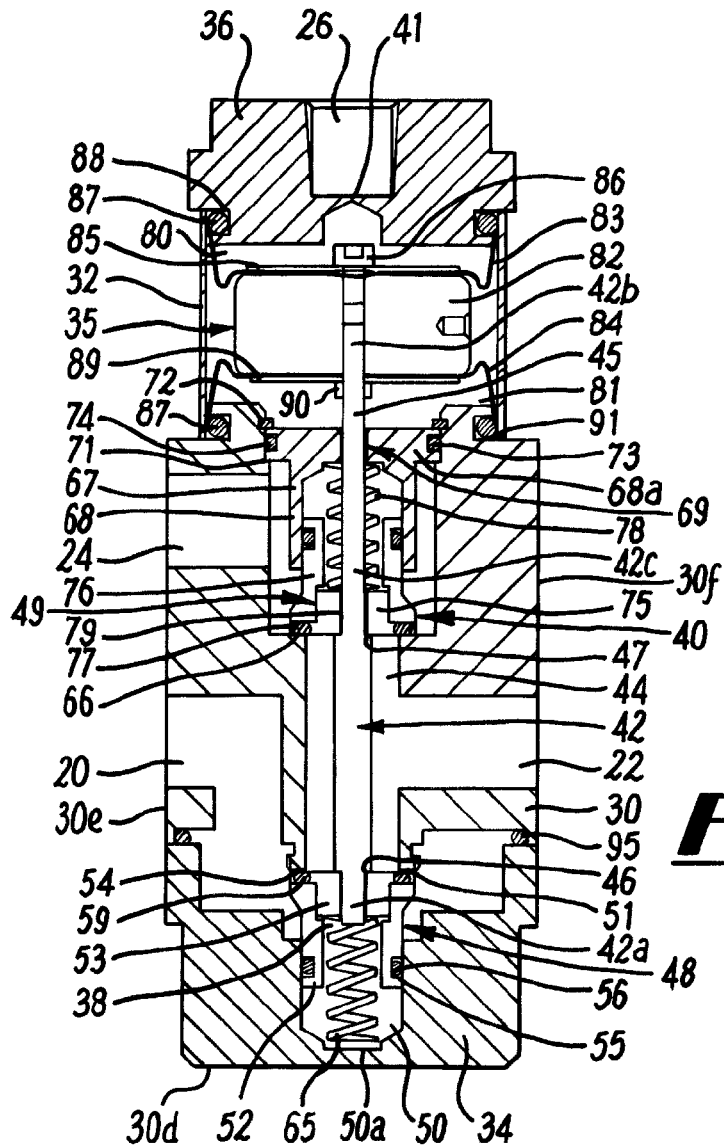
FIG. 5 is a cross section along line A-A of FIG. 3.
Figure 5A:
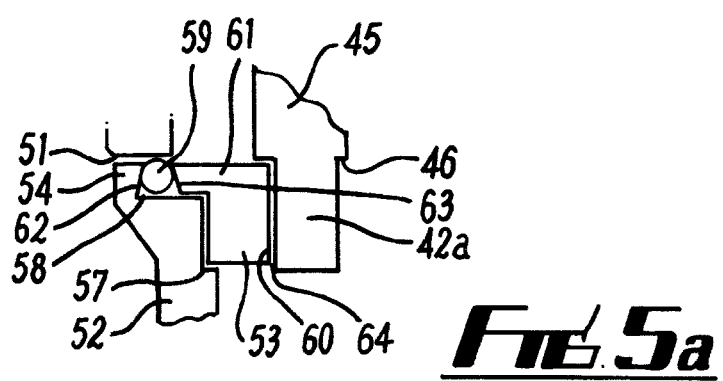
FIG. 5a is an enlarged fragmentary view of part of a supply valve of the device of FIG. 5.

Referring now in particular to FIGS. 5 and 5a, the supply valve chamber 38 is defined by a bore 50 defined in the lower cap 34 and an internal clearance between an inner surface of the cap 34 and the main section 30 of the body. In fact a lower portion of the main section 30 defines an annular seat 51 at the end of the central passage 44 against which the supply valve 48 acts in operation. The valve itself is a poppet-style valve with a cylindrical sleeve 52 and a flat-faced poppet 53 fixed thereto. The sleeve 52 has generally cylindrical inner and outer surfaces, the latter being outwardly flared at an upper end where it terminates in a lip 54 that faces the annular seat 51. The sleeve 52 is designed to fit snugly and slidably in the bore 50 in the lower cap 34 and its outer surface has an annular groove 55 towards its lower end for receipt of an O-ring seal 56 that seals against the wall of the bore 50. The inner surface of the sleeve 52, which is intended to receive the poppet 53, is stepped at 57 to provide a stop and defines a groove 58 immediately inboard of the lip 54 for receipt of a sealing ring 59 for sealing the valve 48 against the seat 51. The poppet 53 comprises a cylindrical body penetrated by a central bore 60 for receipt of the stem 45 and has a radially outward extending flange 61 that extends into the groove 58 in the inside surface of the sleeve 52 where it abuts the sealing ring 59. An inside surface 62 of the lip 54 and an outside surface 63 of the flange 61 each face the sealing ring 59 and are tapered towards each other so as to hold the ring 59 in place between the poppet 53 and the sleeve 52. The poppet 53 is designed to receive the lower end 42a of the valve stem 45, the bore 60 through the poppet having a diameter larger than that of the stem end so as to provide a narrow annular clearance 64. The poppet 53 is disposed between the first annular shoulder 46 on the stem 45 and the step 57 on the inside surface of the sleeve 52 and is biased against the stem shoulder 46 by virtue of a coil spring 65 disposed between a lower face of the poppet 53 and the bottom wall 50a of the bore 50 in the lower cap 34.

The annular clearance 64 between the valve stem 45 and the poppet 53 affords a leak path for the air so that the pressure acting on both faces of the supply valve poppet 53 is equal. This ensures that the fluid forces acting on each side of the poppet are substantially balanced.

The exhaust valve chamber 40 is defined in the main section immediately above the vertical passage 44 and adjacent to the exhaust port 24. It has a diameter greater than that of the vertical passage and thus defines an annular surface 66 for seating of the exhaust valve 49. The chamber 40 is closed at its upper end by a cylindrical guide member 67 that has a cylindrical wall 68 closed at one end by an upper wall 68a that is penetrated by a central bore 69 for receipt of the valve stem 45. A lower end of the guide member 67 is open and receives the exhaust valve 49. The upper wall 68a is retained in the main section 30 of the body 28 on one side by means of an annular ledge 71 in the body 28 on which the wall 68 rests and on the other side by means of a circlip 72. The outer periphery of the wall 68 has an annular groove 73 which houses an O-ring seal 74 for sealing the guide member 67 to the body 28.

The exhaust valve 49 is of similar configuration to the supply valve 48 in that it has the same sleeve and poppet arrangement. The poppet 75 is received in the sleeve 76 in the same manner as for the supply valve 48. The sleeve 76 and poppet 75 are again configured to retain a valve sealing ring 77 between them, the sealing ring 77 sealing against the seat defined by the annular surface 66. A coil spring 78 disposed around the stem 45 acts between the poppet 75 and the guide member 67 so as to bias the exhaust valve 49 against the seat 66. The bore in the poppet 75 is again of such as size to define a clearance 79 between the poppet 75 and the stem 45 so as to provide a leak path for air from the vertical passage 44 to the exhaust valve chamber 40, thereby ensuring that the pressure on each face of the poppet 75 is equal. Similarly, there is an annular clearance between the guide member 67 and the stem 45 defined by the central bore 69 in the upper wall 68, the clearance affording a leak path for air from the exhaust valve chamber 40 into the diaphragm housing 32.

It will be understood from the above description and FIG. 5 that the springs 65, 78 serve to bias both the supply and exhaust valves 48, 49 into normally closed positions in which they are seated against the respective seat surfaces 51, 66.

In both cases the leak paths provided by the clearances 64 and 79 between the valves 48, 49 and the stem 45 ensure equal pressures are present on each side of the poppets 53, 75. This means that the forces on each side are balanced and the valve stem 45 only has to overcome the force of the springs 65, 69 in opening either of the valves 48, 49. Moreover, the leak paths ensure that the pressure applied by the operating fluid flow between the inlet 20 and outlet 22 does not serve to lift the valves 48, 49 off their seats 51, 66

The diaphragm assembly 35 divides the diaphragm housing 32 into upper and lower variable volume chambers 80, 81. The assembly comprises a piston 82 which is fixed to the upper end 42b of the valve stem 45 and is sandwiched between upper and lower rolling diaphragms 83, 84. The upper diaphragm 83 is held against an upper surface of the piston 82 by means of a support washer 85 that is fixed in place by means of a screw 86. The peripheral outer edge of the diaphragm 83 has a lip 87 that is received an annular groove 88 defined in the pilot cap 36 and is held in place by the wall of the diaphragm housing 32. Similarly, the lower diaphragm 84 is held against a lower surface of the piston 82 by a washer 89 and a collar 90 fixed to the valve stem 45. The peripheral outer edge also has a lip 87 which is retained in an annular groove 91 defined in the main section 30 of the housing body 28 by the diaphragm housing wall.

The lower cap 34 is fixed to main section 30 of the body 28 by retaining screws (not shown) and sealed by an O-ring seal 95 disposed in a groove.

When the volume booster is installed the inlet 20 is connected to a supply of operating air and the outlet is connected to the actuator. The booster effectively operated as a three port, three position block-before-bleed valve as both the supply and exhaust valves 48, 49 are normally closed by the springs 65, 78 as shown in FIG. 5. In this position the valve stem 45 is in a central position such that the annular shoulders 46, 47 do not act on the respective valves 48, 49 so as to lift them from their respective seats 51, 66 and thus air is not transmitted to the actuator 16 or to the exhaust port 24.

The operation of the valve stem assembly 42 is dictated by the balance of the respective pressure in the upper and lower chambers 80, 81. If the pressure in the upper chamber 80 is greater than that in the lower chamber 81 the resulting force moves the piston and the valve stem assembly downwards. Conversely if the pressure in the lower chamber 81 is greater than that in the upper chamber 80 the piston moves upwards.

The upper chamber 80 receives a pilot air pressure signal through the orifice 41 whereas the lower chamber 81 receives air that flows from the outlet 22, up the vertical passage 44 and through leak paths 79, 69 around the stem 45. Thus when the pilot signal pressure delivered to the upper chamber 80 is at a predetermined level where it is greater than that in the outlet 22, the pressure in the upper chamber 80 exceeds that in the lower chamber 81 and the diaphragm assembly is forced downwards thereby moving the valve stem downwards. This has the effect of opening the supply valve 48 as the first annular shoulder 46 acts on the poppet 53 and moves it downwards against the biasing force applied by the spring 65. The poppet 53 carries the sleeve 55 with it so the sealing ring 59 lifts off the seat 51 thereby opening the valve 48 and allowing operating air flow from the inlet 20 to outlet 22 and on to the actuator 16.

If the pilot signal pressure is reduced or the outlet pressure increases to an extent where the pressure in the lower chamber 81 is greater than that in the upper chamber 82, the diaphragm assembly 35 moves upwards. This lifts the valve stem 45 and once it has passed the central position shown in FIG. 5, the stem serves to open the exhaust valve 49 whilst leaving the supply valve 48 in the closed position. Since the lower end 42a of the stem 45 is not fixed in the bore 60 of the poppet 53 it moves relative thereto. At the same time the second annular shoulder 47 bears against the poppet 75 of the exhaust valve 49 so as to move it upwards against the biasing force of the spring 78. The poppet 75 carries with it the sleeve 76 so that the sealing ring 77 is lifted off the seat 66 to open the exhaust valve 49. In this position air from the outlet 22 can vent through the exhaust port 24. Since the exhaust port 24 is of the same diameter as the inlet 20 and outlet 22 the exhaust flow can occur at a rate that is equivalent to the flow of the operating air through the inlet and outlet. Once the pilot signal and outlet pressures have equalised the pressure in each of the upper and lower chambers 80, 81 are the same and the exhaust valve 49 moves back to the closed position shown in FIG. 5.

As a result of the force balance arrangement afforded by clearances 64 and 79 between the valve stem 45 and the valves 48, 49, the diaphragm assembly 35 can be made smaller than in conventional designs as the forces required to move the stem 45 are not so large. This allows the volume booster device of the present invention to be more compact.

The sealing ring 59, 77 of each of the valves 48, 49 seals against the respective valve seat 51, 66 at an effective sealing diameter with respect to the central axis of the booster (which coincides with that of the stem 45). The sealing rings 56 provided in the outside surface of the sleeves 52, 76 are designed to seal against the lower cap 34 and guide member 67 respectively at the same diameter as the effective sealing diameter. This ensures that no differential forces act on the valves when the same pressure acts on each end which might otherwise tend to open the valves 48, 49.

Figure 6:
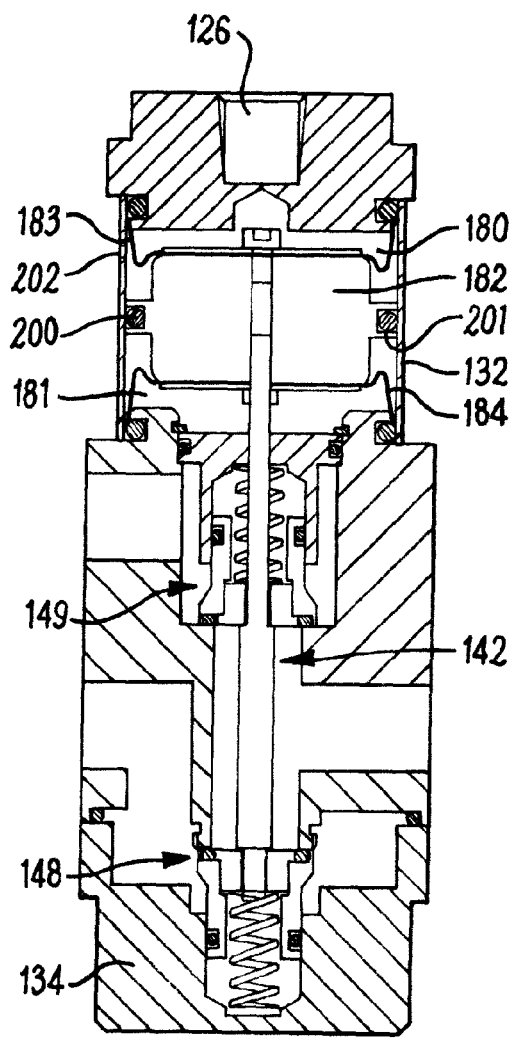
FIG. 6 is a cross section of a modified version of the volume booster fluid flow control device of FIG. 2 to 5, having a fail-safe diaphragm assembly, and in accordance with the present invention.

FIG. 6 shows the same volume booster with a modified diaphragm assembly. Parts corresponding to those of the first embodiment described above in relation to FIGS. 2 to 5 are given the same reference numerals but increased by 100 and are not further described except in so far as they differ from their counterparts of FIGS. 2 to 5. The diaphragm assembly piston 182 is sealed to the inside surface of the diaphragm housing 132 by means of an O-ring 200 disposed in an annular channel 201 defined on the piston periphery. This ensures that even if the diaphragms 183, 184 fail the upper and lower chambers 180, 181 remained separated. The upper chamber 180 has a vent 202 defined by a small opening in the wall of the housing 132. If the upper diaphragm 183 fails the pilot pressure signal entering through the pilot inlet 126 will leak through the vent 202. As a consequence the reduced pressure in the upper chamber 180 will generally mean that the supply valve 148 will either be moved to the closed position or will be open but with the outlet pressure lower than required. This is in contrast to conventional volume boosters that fail with the supply valve in the open position.

If the lower diaphragm 184 fails air pressure in the lower chamber 181 leaks through the lower diaphragm into the space between it and the piston 182. The air is able to leak past the O-ring seal 200 and out through the vent 202. The result of this is that the outlet pressure is will be slightly lower than normal.

The provision of a vent 202 of this kind thus eliminates the requirement for a downstream pressure relief valve.

Figure 7:
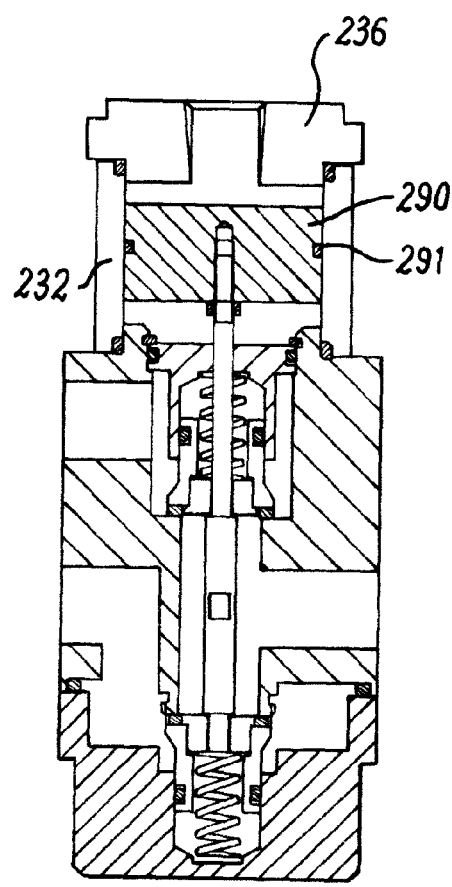
FIG. 7 is a cross sectional view of an alternative embodiment of the volume booster fluid flow control device of the present invention.

FIG. 7 shows a further alternative arrangement in which the rolling diaphragm assembly 35 is replaced by a close-fit metal piston 290 (although other materials may be used) with a peripheral PTFE sealing ring 291 (sometimes referred to as a "wiper seal"). In another variations the sealing ring may be omitted. The structure of the booster is otherwise almost identical to the preceding embodiments except that the diaphragm housing 232 and the pilot cap 236 have been modified slightly.

In all embodiments the valve stem assembly 42, 142 uses identical components for both the supply and exhaust valves 48, 148, 49,149 and so fewer different parts are required allowing for ease of manufacture and assembly.

A solenoid-operated valve may be provided at the pilot inlet port 26 to switch the pilot signal on or off as required.

The diaphragm assembly in each embodiment could be replaced by an electrically-operated solenoid having an output stroke that acts on the valve stem.

It will be understood that the diaphragm assembly could be adapted so that the outlet pressure is proportional to the pilot pressure signal rather than equal to it.

Both the volume booster embodiments described above may be fitted with a filter in the lower cap 34, 134. The filter may be constructed from a rigid porous material such as, for example, a sintered stainless steel and serves to remove particulate or liquid/moisture contaminants from the operating fluid.

The above-described embodiments can each be used in conjunction with the stacking directional control valves described in our co-pending International Patent Application No. PCT/GB2007/004555 which may be used to control the supply of the pilot pressure signal to the pilot inlet.

The volume booster may be fitted with a pressure gauge for visual inspection but is typically operated by a control system (not shown in the figures) so that operating and pilot fluid is supplied on demand when it is necessary to operate the valve positioner. There may be a solenoid-operated valve at the pilot inlet port that effectively serves to switch the pilot pressure on and off as required.

The arrangement of the device allows an unregulated high flow input pressure to be translated into a high flow output at a regulated pressure whose magnitude is determined substantially by the pressure of the low flow pilot fluid. It also allows for operating air to be exhausted much quicker than in conventional devices that direct the air to dissipate through a port in the diaphragm assembly and is more compact than providing an external exhaust conduit.

The exhaust port may be defined on any face of the front, rear and side faces 30a, 30b, 30e, 30f of the housing It will be appreciated that the device can be provided in a range of sizes to suit all applications and that all components including seals can be designed to operate at extreme temperatures such as those found in arctic conditions.

It is will be appreciated by one of ordinary skill in the art that the invention has been described by way of example only, and that the invention itself is defined by the claims. Numerous modifications and variations may be made to the exemplary design described above without departing from the scope of the invention as defined in the claims. For example, although the device is described above in relation to controlling an actuator in a valve positioner it can be used in any application where the pressure of a large flow volume is to be regulated by a low flow pilot signal.

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

I claim:

1. A fluid flow control device comprising: a housing defining an inlet, an outlet and an exhaust port all for an operating fluid; a pilot inlet for receipt of a pilot signal; a supply path in said housing that extends between the inlet and outlet; an exhaust flow path in the housing that extends between the outlet and the exhaust port;

a supply valve chamber interrupting the supply path, a supply valve supported in the supply valve chamber for movement between an open position in which it permits fluid to flow through the supply valve chamber from the inlet to the outlet and a closed position where it prevents significant fluid flow through the valve chamber to the outlet; an exhaust valve chamber in the exhaust path, an exhaust valve in the exhaust valve chamber for movement between an open position in which it permits fluid to flow through the exhaust valve chamber from the outlet to the exhaust port and a closed position where it prevents significant fluid flow through the valve chamber to the exhaust port; a reciprocal actuating member in the housing and engageable with the supply valve and the exhaust valve for moving the supply and exhaust valves between the open and closed positions, the actuating member being movable in response to a difference between the pilot signal and the outlet fluid pressure between a first position in which supply valve is closed and exhaust valve is closed, a second position in which the supply valve is open and the exhaust valve is closed, and a third position in which the exhaust valve is open and the supply valve is closed; wherein there is a first fluid leak path defined by the supply valve for allowing fluid to leak through the supply valve chamber when the supply valve is open, a second fluid leak path defined by exhaust valve for allowing fluid to leak through the exhaust valve chamber.

2. A fluid flow control device according to claim 1, further comprising a first biasing member for biasing the supply valve to the closed position.

3. A fluid flow control device according to claim 1, further comprising a second biasing member for biasing the exhaust valve to the closed position.

4. A fluid flow control device according to claim 1, where the supply and exhaust valve chambers each define a respective valve seat, the respective supply and exhaust valves being clear of the respective valve seat in the open positions and sealed against the valve seat in the closed positions.

5. A fluid flow control device according to claim 1, wherein the supply valve comprises a poppet having a bore in which part of the actuating member is received, the first leak path being defined by a clearance between a wall of the bore in the poppet and the actuating member.

6. A fluid flow control device according to claim 5, wherein the supply valve poppet is received in a support member, a supply valve seal being received between the poppet and the support member.

7. A fluid flow control device according to claim 6, wherein the support member is in the form of a sleeve.

8. A fluid flow control device according to claim 7, wherein the sleeve has an outer surface and a sleeve sealing member disposed between the outer surface and an internal wall of the housing.

9. A fluid flow control device according to claim 8, wherein the valve seal and the sleeve sealing member are disposed such that they are aligned in the direction of movement of the supply valve between the open and closed positions.

10. A fluid flow control device according to claim 1, wherein the exhaust valve comprises a poppet having a bore in which part of the actuating member is received, the second leak path being defined by a clearance between a wall of the bore in the poppet and the actuating member.

11. A fluid flow control device according to claim 10, wherein the exhaust valve poppet is received in a support member, an exhaust valve seal being received between the poppet and the support member.

12. A fluid flow control device according to claim 11, wherein the exhaust valve support member is in the form of a sleeve.

13. A fluid flow control device according to claim 12, wherein the exhaust valve sleeve has an outer surface and a sleeve sealing member disposed between the outer surface and an internal wall of the housing.

14. A fluid flow control device according to claim 13, wherein the valve seal and the sleeve sealing member are disposed such that they are aligned with each other in the direction of movement of the exhaust valve between the open and closed positions.

15. A fluid flow control device according to claim 6, wherein the supply valve and exhaust valve seals are each received in a groove defined between the respective poppet and the respective sleeve, the groove having a pair of tapered walls for retaining the respective valve seal therein.

16. A fluid flow control device according to claim 15, wherein the respective poppet has a flange and the respective sleeve has a lip between which the groove is defined.

17. A fluid flow control device according to claim 1, wherein the actuating member is an elongate valve stem reciprocally disposed in the housing and selectively and independently engageable with the supply and exhaust valves.

18. A fluid flow control device according to claim 17, wherein the valve stem has a first shoulder for engaging the supply valve such that movement of the stem to the second position causes the first shoulder to engage the supply valve and move it to the open position.

19. A fluid flow control device according to claim 18, wherein the valve stem has a second shoulder for engaging the exhaust valve such that movement of the stem to the third position causes the second shoulder to engage the exhaust valve and move it to the open position.

20. A fluid flow control device according to claim 1, wherein the pilot inlet is configured to receive a pilot signal in the form of a fluid pressure signal.

21. A fluid flow control device according to claim 1, wherein there is provided a piston member connected to the actuating member and disposed so as to define first and second variable volume chambers in the housing, the first variable volume chamber being in fluid communication with the pilot inlet and the second variable volume chamber being in fluid communication with the outlet such that a pressure differential between the fluid in the first and second variable volume chambers causes the piston to move and the actuating stem to move between said first, second or third positions.

22. A fluid flow control device according to claim 21, wherein the actuating member is movable to said second position by the piston member when the fluid pressure in the first chamber exceeds that in the second chamber.

23. A fluid flow control device according to claim 21, wherein the actuating member is movable to the third position by the piston member when the fluid pressure in the second chamber exceeds that in the first chamber.

24. A fluid flow control device according to claim 21, wherein the piston member is sealed to the housing.

25. A fluid flow control device according to claim 21, wherein there is provided first and second flexible diaphragms, a first diaphragm being disposed between the first chamber and the piston member and being sealed to the housing, a second diaphragm being disposed between the second chamber and the piston member and being sealed to the housing.

26. A fluid flow control device according to claim 21, wherein there is provided a vent in the housing at the first chamber for venting pressure to atmosphere.

27. A fluid flow control device according to claim 21, wherein the actuating member has a first end that is slidably disposed in the supply valve and a second end that is fixed to the piston member.

28. A fluid flow control device according to claim 21, wherein there is provided a third leak path defined between the housing and a support for the exhaust valve, the leak path providing fluid communication between the exhaust valve chamber and the second variable volume chamber.

29. A fluid flow control device according to claim 21, wherein the exhaust port is defined in the housing between the inlet and the second variable volume chamber.

30. A fluid flow control device according to claim 29, wherein the exhaust port is defined immediately adjacent to the exhaust valve chamber.

31. A fluid flow control device according to claim 1, wherein the exhaust port is substantially same size as inlet.

* * * * *